United States Patent Office 2,860,170
Patented Nov. 11, 1958

2,860,170

PREPARATION OF DIMETHYL ETHER FROM ALKALI METAL METHYL CARBONATES

John M. Criscione and William H. Bernauer, Butler, Pa., assignors to Callery Chemical Company, Pittsburgh, Pa., a corporation of Pennsylvania No Drawing. Application April 29, 1957
Serial No. 655,524

5 Claims. (Cl. 260—614)

This invention relates to the preparation of dimethyl ether, $(CH_3)_2O$, and more particularly to a new method for its preparation by the thermal decomposition of an alkali metal methyl carbonate, $MCH_3CO_3$.

The alkali metal methyl carbonates are produced as by-products from the preparation of trialkylborates and alkali metal borohydrides, as is disclosed in Cunningham, Serial Number 550,462, filed December 1, 1955, and Kyllonen, Serial Number 514,249, filed June 9, 1955, co-pending applications of common ownership with this application. Because of their availability as by-products it is desirable to find simple methods of utilizing these compounds.

It is an object of this invention to provide a simple and inexpensive method of preparing dimethyl ether directly from an alkali metal methyl carbonate. Other objects and advantages of this invention will be apparent from the following specification and claims.

This invention is based on the discovery that alkali metal methyl carbonates decompose at elevated temperatures to produce dimethyl ether, carbon dioxide, and sodium carbonate according to the equation:

$$2MCH_3CO_3 = M_2CO_3 + CO_2 + (CH_3)_2O$$

where M represents the alkali metal. This decomposition reaction proceeds above temperatures of about 225° C., and proceeds more rapidly at somewhat higher temperatures. At elevated temperatures, e. g., above 550° C., the reaction proceeds still more rapidly; however, the yield of dimethyl ether is reduced because of carbonization reactions. It is preferred, therefore, to carry out the reaction at a temperature at which the reaction is relatively rapid and there is essentially no carbonization. The preferred temperature range is about 300 to 350° C. The reaction occurs at atmospheric pressure; however, if desired, subatmospheric pressure may be used to increase the rate of decomposition. Since dimethyl ether is flammable it is preferred to carry out the reaction in the absence of air.

When the alkali metal methyl carbonate is thermally decomposed the gaseous dimethyl ether and carbon dioxide are expelled leaving a solid residue of high purity sodium carbonate. In addition to the main reaction products, methanol and carbon monoxide are sometimes found in the expelled gases. The dimethyl ether is separated by any of a number of conventional processes. For example, methanol and carbon dioxide may be scrubbed from the gas mixture with water or lime solution. Or the mixtures can be separated by fractional condensation or fractional distillation, or by other methods familiar to those skilled in the art.

Example 1.—Sodium methyl carbonate (0.48 gram) was placed in a Pyrex tube heated by muffle furnace. Both ends of the tube were fitted with stopcocks to provide for sweeping with an inert gas (e. g., nitrogen, carbon dioxide, etc.) and the discharge of the gases generated in the reaction. The inert sweep gas prevents atmospheric contamination and aids in removing the volatile products from the reaction zone. The gases generated were measured by displacement of liquid in a receiver. The tube and contents were heated to a maximum temperature of 541° C., with a very slow bleed of nitrogen gas through the tube. The gases evolved from the reaction contained dimethyl ether and carbon dioxide in equimolar amounts. The residue remaining in the tube contained over 90% sodium carbonate; the sodium carbonate was grey colored, indicating that some carbonization had occurred.

Example 2.—Sodium methyl carbonate (0.146 gram) was placed in a test tube which was connected to a gas collection bottle and heated by a muffle furnace. The system was sealed off from the atmosphere and evacuated. The sodium methyl carbonate was heated to 332° C. and the gases produced by the reaction were collected in the gas collection bottle. The gases thus collected were analyzed and found to contain carbon dioxide and dimethyl ether in equimolar proportions. There was also present small amounts of methanol, carbon monoxide, and hydrogen. There was recovered 0.43 millimole of dimethyl ether, a yield of 58%. The solid residue remaining in the tube was essentially pure sodium carbonate. The sodium carbonate produced was white indicating that there was essentially no carbonization.

Example 3.—Sodium methyl carbonate was heated in the same manner as above to a temperature of 225° C. in an atmosphere of $CO_2$. An 11% yield of dimethyl ether was recovered from the gases evolved during a two hour heating period.

Dimethyl ether may be produced in like manner from other alkali metal methyl carbonates.

According to the provisions of the patent statutes, we have explained the principle and mode of practicing our invention and have described what we now consider to be its best embodiment. However, we desire to have it understood that, within the scope of the appended claims, the invention may be practiced otherwise than as specifically described.

We claim:

1. A method of preparing dimethyl ether that consists of heating an alkali metal methyl carbonate at a temperature above about 225° C., and recovering the dimethyl ether formed.

2. A method according to claim 1 in which the alkali metal methyl carbonate is sodium methyl carbonate.

3. A method according to claim 2 in which the temperature is between about 300 and 350° C.

4. A method according to claim 1 in which the pressure is subatmospheric.

5. A method of preparing dimethyl ether that consists of heating sodium methyl carbonate to a temperature between about 300 and 350° C. at subatmospheric pressure and recovering the dimethyl ether formed.

References Cited in the file of this patent

Ogston: Trans. Faraday Soc., vol. 32 (1936), pp. 1679–84.